United States Patent [19]

Zalucha et al.

[11] 4,293,665

[45] Oct. 6, 1981

[54] STRUCTURAL ADHESIVE FORMULATIONS

[75] Inventors: Denis J. Zalucha, Waterford; Frederick H. Sexsmith, Erie; Ernest C. Hornaman, Girard; Terrance H. Dawdy, Erie, all of Pa.

[73] Assignee: Lord Corporation, Erie, Pa.

[21] Appl. No.: 111,504

[22] Filed: Jan. 11, 1980

Related U.S. Application Data

[63] Continuation-in-part of Ser. No. 899,621, Apr. 24, 1978, Pat. No. 4,223,115.

[51] Int. Cl.³ .................................................. C08K 5/52
[52] U.S. Cl. ........................................ 525/255; 526/193
[58] Field of Search ................... 525/126, 255, 455; 156/327, 332; 526/277, 193

[56] References Cited

U.S. PATENT DOCUMENTS

| | | | |
|---|---|---|---|
| 3,160,618 | 12/1964 | Delacretaz | 526/193 |
| 3,222,335 | 12/1965 | Delacretaz | 526/193 |
| 3,476,723 | 11/1969 | Stahl | 260/885 |
| 3,847,846 | 11/1974 | Asada | 526/277 |
| 3,970,505 | 7/1976 | Hauser | 156/332 |
| 3,984,500 | 10/1976 | Dickie | 260/885 |
| 3,994,764 | 11/1976 | Wolinski | 156/332 |
| 4,001,150 | 1/1977 | Juna | 525/126 |
| 4,044,044 | 8/1977 | Saito | 526/277 |
| 4,081,308 | 3/1978 | Skoultchi | 525/455 |

*Primary Examiner*—Paul R. Michl
*Attorney, Agent, or Firm*—John A. Gazewood

[57] ABSTRACT

Novel structural adhesive systems for metal-bonding applications. The adhesives, comprising a solution or dispersion of a polymeric material in a monomer copolymerizable therewith having incorporated therein certain phosphorus-containing compounds, are characterized by an unexpected ability of providing strong adhesion to untreated metal surfaces without adversely affecting adhesive performance, including resistance to deleterious environments. The environmental resistance of the herein described adhesives can be further improved by the addition of one or more polybasic lead salts, metal molybdates and metal phosphates.

4 Claims, No Drawings

STRUCTURAL ADHESIVE FORMULATIONS

This application is a continuation-in-part of application Ser. No. 899,621, filed Apr. 24, 1978, now U.S. Pat. No. 4,223,115.

The present invention relates to adhesive compositions. More particularly, the invention relates to structural adhesive compositions having improved adhesion to metal substrates, especially untreated metal substrates.

A feature of structural adhesives is their contribution to the loadbearing or stress-relieving properties of the structure in which they are used. The physical and chemical requirements of structural adhesives are very exacting since the bonds must not only resist any applied stress but they must also not adversely affect the physical properties of the materials being bonded. Generally, it is desirable that the strength of the bond be no less than that of the weaker material being bonded. A familiar example of an extensible application of structural adhesives is in plywood fabrication.

A burgeoning attractive application for structural adhesives is in the bonding of lightweight metal and thermoplastic substrates, such as in the transportation industry, for example in fabricating vehicle bodies. As thinner steel and more aluminum are used in order to effect weight saving, it becomes increasingly more desirable to distribute load stresses over larger areas rather than to concentrate such stresses by riveting or spot welding. Adhesive bonding may be the only viable vehicle to achieve this end, especially when one of the members is a nonmetal such as a glass fiber reinforced plastic. Adhesive bonding can reduce or eliminate costly finishing operations necessitated by riveting and welding and present a more pleasing exterior. There are fewer holes or stress points for corrosion in bonded assemblies and dissimilar metals can be joined with less chance of establishing galvanic corrosion cells.

The commercial structural adhesives employed with wood products generally provide satisfactory results; however, structural adhesives employed with metal and plastic materials are not without their deficiencies. For example, adhesive systems which have been proposed for metal bonding have often been inconsistent in both application and bonding quality. Another such problem area is the lack in one or more of the essential requirements for metal to metal bonds, such as high bond, peel and impact strength and resistance to solvents, chemicals and other aggressive environments. Many of the present structural adhesive systems are heat-activated, that is, they require a heat energy input to initiate the curing mechanism. The need for heat activation is of increasing concern in energy-short areas. The elevated activation temperatures can also adversely affect both plastic and metal structural components. Further, many structural adhesives, while being effective bonding agents for plastic materials, are ineffective with metal surfaces. Still another problem, especially with metals, is the condition of the surface(s) being bonded. For example, mill-run metals generally have on their surfaces oleaginous materials resulting from lubricants employed during forming operations or deliberately applied as a protective coating during handling, shipping and storage or as a lubricant for subsequent forming operations. Most adhesive systems require extensive metal preparation to remove such oleaginous films and otherwise prepare the surface for bonding. As an example, a representative metal pretreatment to prepare aluminum surfaces for bonding includes the following steps:

(a) The substrate is cleaned with a solvent such as acetone or perchloroethylene;

(b) The substrate is then vapor-degreased by exposure for 30 seconds to trichloroethylene vapors;

(c) The substrate is next soaked for 10–15 minutes in an alkaline cleaning solution at 70° C.;

(d) The substrate is then rinsed with tap water;

(e) After the tap water rinse, the substrate is acid etched by immersion for 10–15 minutes in a solution maintained at 70° C. of 30 parts deionized water, 10 parts concentrated sulfuric acid and 1 part sodium dichromate;

(f) The acid-etched substrate is then sequentially rinsed with tap water and deionized water; and, finally, (g) The substrate is dried for 30 minutes at 75° C. Other extensive pretreatments are required for steel.

The acrylated adhesive systems disclosed in Briggs et al U.S. Pat. No. 3,890,407 have been found to be effective for bonding oily metal surfaces at room temperature without an extensive pretreatment. However, the Briggs et al adhesives employ an oily primer which has a short working or pot life, which makes application of the adhesive resin difficult. In addition, Briggs et al compositions, as do many of the acrylated adhesive systems, contain halogenated polymers which tend to evolve hydrogen chloride when exposed to high temperature baking cycles such as are required for curing paints, which leads to a significant incidence of underbond corrosion. Further, the overall performance of the Briggs et al acrylated adhesive systems in bonding aluminum alloys which are subsequently exposed to aggresive environments such as salinity and humidity is poor. There remains a definite need for structural adhesive systems which are not heat activated, which are effective in bonding both plastics and metals, which can bond metals including oily metals, without extensive surface pretreatment, and which are less susceptible to degradation when exposed to elevated temperatures and more resistant to aggressive environments, including saline and humid environments.

Following an extensive research effort, it has been discovered that the addition of certain phosphorus-containing compositions to addition-polymerizable materials selected from the group consisting of ethylenically unsaturated monomers, polymers derived from such monomers, and mixtures thereof, provides a series of room temperature-curable structural adhesive systems having unexpected enhanced adhesion to substrates, especially metal substrates, in particular oily metal substrates, without requiring abrading, sand blasting, phosphatizing, etching or other extensive pretreatment of the mating surfaces, without adversely affecting resistance to attack by aggressive environments, including saline and humid environments. The adhesive systems of the invention have wide application, including use as a bonding material for metal-plastic and plastic-plastic structures, as well as metal-metal structures. The invention further provides a novel adhesive primer for activating metal surfaces and methods for adhesive bonding employing the novel adhesive and adhesive primer systems of the invention, as well as adhesively-bonded composite structures prepared in accordance with the present invention.

The novel structural adhesives of the present invention can be described as room temperature-curable adhesives comprising at least one addition-polymerizable material selected from the group consisting of ethylenically unsaturated monomers, polymers derived from such monomers and mixtures thereof, which are cured through the mechanism of redox couple catalyst systems. In particular, the adhesive systems comprise, in combination, (1), at least one addition-polymerizable material selected from the group consisting of ethylenically unsaturated monomers, polymers derived from such monomers, and mixtures thereof; (2), phosphorus-containing compound; and (3), room temperature-active redox couple catalyst system. More specifically, the structural adhesive systems of this invention in a first embodiment comprise, in combination, (a), at least one addition-polymerizable material selected from such ethylenically unsaturated monomers, polymers derived from such monomers and mixtures thereof; (b), phosphorus-containing compound; (c), reducing agent; and (d), a bonding accelerator containing (e), an oxidizing agent, said oxidizing agent being reactive at room temperature with said reducing agent to produce free radicals effective to initiate polymerization of said ethylenically unsaturated monomer or polymeric derivative thereof. In a second embodiment, the invention adhesive systems comprise in combination, (i), at least one polymerizable ethylenically unsaturated monomer, polymer derived from such monomer, and mixtures thereof; (ii), reducing agent; and (iii), a bonding accelerator containing a mixture of (iv), a phosphorus-containing compound and (v), an oxidizing agent, said oxidizing agent being reactive at room temperature with said reducing agent to produce free radicals effective to initiate polymerization of said ethylenically unsaturated monomer or polymeric derivative thereof.

The novel adhesive primers of the invention comprise, in combination, a mixture of a phosphorus-containing compound and an oxidizing agent, said oxidizing agent being reactive at room temperature with a reducing agent to produce free radicals effective to initiate polymerization of addition-polymerizable ethylenically unsaturated monomers and polymers derived from such monomers.

The invention includes, in one aspect, a multi-part adhesive system comprising (I), as a polymerizable adhesive base composition, a mixture containing at least one polymerizable material selected from the group consisting of ethylenically unsaturated monomer, polymer derived from such monomer, and mixtures thereof; a phosphorus-containing compound; and a reducing agent; and (II), a bonding accelerator containing an oxidizing agent, the oxidizing agent being reactive at room temperature with said reducing agent to produce free radicals effective to initiate polymerization of addition-polymerizable monomers and polymers, including mixtures thereof.

In another aspect, the invention provides multi-part adhesive systems comprising (I), as a polymerizable adhesive base composition, a mixture of at least one polymerizable material selected from the group consisting of ethylenically unsaturated monomer, polymer derived from such monomer, and mixtures thereof and a reducing agent; and (II), as a bonding accelerator, a mixture of a phosphorus-containing compound and an oxidizing agent, the oxidizing agent being reactive at room temperature with said reducing agent to produce free radicals effective to initiate polymerization of ethylenically unsaturated monomers and polymers, including mixtures thereof.

Yet another aspect of the invention provides a process for bonding surfaces, especially metal surfaces, which comprises, (A), applying to at least one of such surfaces a bonding accelerator containing an oxidizing agent as defined herein; (B), applying to at least one of such surfaces a base adhesive composition comprising a mixture containing an addition-polymerizable monomer or polymer, a phosphorus-containing compound and a reducing agent; and (C), placing the surfaces so treated in abutting relationship until the adhesive composition polymerizes to effect bonding of the surfaces to provide a unitary bonded composite structure.

A further aspect of the invention provides a process for bonding surfaces, especially metal surfaces, particularly oily metal surfaces, which comprises, (A), applying to at least one of such surfaces a bonding accelerator containing a mixture of a phosphorus-containing compound and an oxidizing agent as defined herein; (B), applying to at least one of such surfaces a base adhesive composition containing at least one addition-polymerizable monomer or polymer and a reducing agent; and (C), placing the thus-treated surfaces in abutting relationship until the adhesive composition polymerizes to effect bonding of the surfaces to produce a unitary bonded composite structure.

A yet further aspect of the invention provides a process for bonding surfaces, including metal surfaces, and including oily metal surfaces, which comprises, (A), applying to at least one of such surfaces an adhesive mass containing at least one addition-polymerizable monomer or polymer, reducing agent, phosphorus-containing compound and oxidizing agent, as defined herein and, (B), placing the thus-treated surfaces in abutting relationship until the adhesive composition polymerizes to effect bonding of the surfaces to produce a unitary bonded composite structure.

The adhesive systems of this invention have been found to increase unexpectedly the bonding of untreated surfaces, including oily metals, especially steel, aluminum and copper, without deleteriously affecting the resistance of the bonded assemblies to attack from aggressive environments. In addition, the concepts of the invention now permit the use as metal bonding agents of many structural adhesive systems which heretofore were effective only for bonding plastic materials. Further, the herein-described adhesive systems are aerobic, that is, the compositions remain stable in storage indefinitely in the absence of air (oxygen) and will cure at room temperature in the presence of air or oxygen to form tough durable bonds. They can thus be employed with both porous and solid substrates, unlike the anaerobic adhesives which require the presence of oxygen for storage and cannot be used on porous substrates containing air in their pores because such adhesives require the absence of air for curing.

As noted, the present invention provides a series of novel structural adhesives containing as essential component at least one addition-polymerizable ethylenically unsaturated monomer or a polymer derived from such monomer, a phosphorus-containing compound and a room temperature-active redox couple catalyst system.

A first class of room temperature-curable structural adhesive system comprises

I. As a polymerizable adhesive composition, a mixture of 1. a polymer-in-monomer syrup consisting essentially of (i) from about 2 to about 60, preferably about 5 to about 60, weight percent of at least one addition polymer;

(ii) From about 10 to about 98, preferably about 15 to about 80, weight percent of at least one polymerizable monomeric liquid olefinically unsaturated compound having at least one $>C=C<$ group, said $>C=C<$ group preferably having the structure $CH_2=C>$, said group being preferentially terminally located; and (iii) from zero to about 30, preferably about 0.5 to about 15, weight percent of a polymer containing the group $-(CH_2CCl=CH-CH_2)_{\overline{n}}$, wherein n is an integer;

wherein (i) and (ii) are present as a partial polymerization product of (ii) or of (ii) in the presence of (iii); the mixture of (i) and (ii) or (i), (ii) and (iii) being a syrup of polymeric materials disdolved or dispersed in monomer in which syrup the amount of (i) derived from (ii) is in the range from about 2 to about 90, preferably about 2 to about 60, weight percent, based on total weight of (i), (ii) and (iii);

2. from zero to about 5 percent by weight of polymerizable adhesive composition of at least one unsaturated dicarboxylic acid ester;

3. from zero to about 10 percent by weight of polymerizable adhesive composition of at least one unsaturated polyester resin;

4. from zero to about 20 percent by weight of polymerizable adhesive composition of at least one unsaturated carboxylic acid;

5. from zero to about 40 percent by weight of polymerizable adhesive composition of at least one monomeric acrylic or methacrylic acid ester, said ester (5) being in addition to any such ester employed in 1 (ii);

6. from zero to about 50 percent by weight of polymerizable adhesive composition of at least one polyvinyl alkyl ether; and 7. from zero to about 1 percent by weight of polymerizable adhesive composition of at least one waxy substance selected from the group consisting of paraffin wax, montan wax, beeswax, ceresine wax and spermaceti wax;

8. an effective amount of at least one phosphorus-containing compound; and 9. an effective amount of at least one reducing agent; the amount of (1), in percent by weight, being 100 minus the combined percents by weight of (2) thru (9); and II. As a bonding accelerator, an effective amount of at least one oxidizing agent, said oxidizing agent being reactive at room temperature with said reducing agent to generate free radicals effective to initiate addition polymerization of said polymerizable adhesive composition.

A particularly preferred embodiment of such first class of room temperature-curable adhesive system comprises I. As a polymerizable adhesive composition, a mixture of 1. a first syrup of polymethylmethacrylate, polystyrene and polychloroprene in monomeric methyl methacrylate and styrene, said first syrup being in the form of a partial polymerization product of methyl methacrylate and styrene in polychloroprene, the polychloroprene being present in an amount from about 1 to about 25 percent by weight of polychloroprene, methyl methacrylate and styrene, the balance being essentially methyl methacrylate and styrene with the methyl methacrylate predominating;

2. methacrylic acid;

3. a second syrup of at least one polymer of at least one alkyl ester of acrylic or methacrylic acid, the alkyl moiety of such ester containing from 1 to 8 carbon atoms, said syrup being in the form of a partial polymerization product of said alkyl ester in methyl methacrylate, said polymer being present in an amount from about 15 to about 60 percent by weight of such second syrup;

the relative proportions of (1), (2) and (3) being from about 10 to 52 percent by weight of (1), from about 7 to not more than 15 percent by weight of (2) and from about 33 to about 83 percent by weight of (3);

4. an effective amount of at least one phosphorus-containing compound; and 5. an effective amount of at least one reducing agent; and 6. as a bonding accelerator, an effective amount of at least one oxidizing agent, said oxidizing agent being reactive at room temperature with said reducing agent to generate free radicals effective to initiate addition polymerization of said adhesive composition.

With respect to the herein-disclosed classes of structural adhesive system, the invention includes, in each case and all preferred embodiments thereof, adhesive systems wherein the phosphorus-containing compound is incorporated into the bonding accelerator. In such instances, the phosphorus-containing compound is generally omitted from the polymerizable adhesive compositions as described for each class. Such omission, although preferred, is not mandatory.

Polymer-in-monomer syrups, compositionally as well as their preparation, are well-known in the art. Representative syrups, including precursor liquid monomer compounds containing at least one olefinically unsaturated group, and their preparation are disclosed in U.S. Pat. Nos. 3,333,025; 3,725,504; and 3,873,640. Briefly, such syrups are conveniently prepared by deaerating the starting mixture consisting essentially of at least one polymerizable liquid olefinically unsaturated compound and, when used, polymer containing the group $-(CH_2-CCl=CH-CH_2)_{\overline{n}}$, for a short period at about 40° C. under vacuum and then heating the mixture to about 75° C. under an inert gas atmosphere. A catalyst, for example, a free radical-generating catalyst such as benzoyl peroxide or azodiisobutyric acid dinitrile, is then added, preferably in the form of a solution. The quantity of catalyst added is such that it will be completely consumed when the desired viscosity is reached. After the reaction is completed the polymer-in-monomer syrup is cooled. Preferably, the syrups have a viscosity in the range from about 500 to about 1,000 mPa.s at 20° C.

Monomeric liquid olefinically unsaturated compounds suitable for use in the several classes of adhesives for forming polymer-in-monomer syrups and as additional polymerizable materials are characterized by the presence of at least one

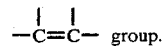 group.

The olefinically unsaturated group is preferably a vinyl group, more preferably terminally located with acrylic and substituted acrylic monomers being currently preferred. Representtive olefinically unsaturated monomers include, without limitation, methyl methacrylate, butyl methacrylate, ethyl acrylate, diethylene glycol dimethacrylate, methacrylic acid, acrylic acid, acrylonitrile, methacrylonitrile, styrene, vinyl styrene, vinyl acetate, chlorostyrene, glycidyl methacrylate, itaconic acid, acrylamide, methacrylamide, vinylidene chloride, 2,3-dichloro-1,3-butadiene, 2-chloro-1,3-butadiene, methylstyrene and n-butylstyrene.

Polymers containing the grouping $-(CH_2-CCl=CH-CH_2)_n$, wherein n is an integer, are well-known in the art under the name neoprene, which is produced by the polymerization of 2-chloro=1,3-butadiene. Further elucidation would be superfluous.

Unsaturated dicarboxylic acid esters suitable for use in the invention are preferably alkyl esters, with the alkyl moiety having from 1 to 18, preferably 1 to 8, carbon atoms. Substantially any unsaturated dicarboxylic acid can be employed, with fumaric and maleic acids being particularly preferred.

Unsaturated polyester resins suitable for use in the adhesive systems described herein are well-known in the art. Such resin esters are derived from polycarboxylic acids and polyhydric alcohols, preferably dicarboxylic acids and dihydric alcohols, at least one of the acid and alcohol components being unsaturated. Preferably, the unsaturated polyester resin component will contain a relatively large number of double bonds and be derived from short chain aliphatic polyhydric polyols, such as ethylene glycol and 1,3-propylene glycol, and short chain unsaturated polybasic acids, such as fumaric acid and maleic acid. Such resins can contain quantities of longer chain polyol such as 1,6-hexanediol, as well as higher polybasic acids, such as adipic acid and phthalic acid.

Unsaturated carboxylic acids which can be used to advantage in the practice of the invention include both monocarboxylic and polycarboxylic acids. At the present time, olefinically unsaturated monocarboxylic acids are preferred, with acrylic acid and methacrylic acid being especially preferred.

Polyvinyl alkyl ethers suitable for use in the several classes of adhesive described herein are well-known in the art. Such ethers will preferably contain 1-8, more preferably 1-4, carbon atoms in the alkyl moiety of said ether. Likewise, styrene-acrylonitrile polymers are well-known for in the art as are chlorosulfonated polyethylenes and chlorinated polyethylenes. Further discussion of these materials is considered unnecessary.

Phosphorus-containing compounds which are suitable for use in each class of structural adhesive system, admixed into polymerizable adhesive composition, bonding accelerator, or both polymerizable adhesive composition and bonding accelerator, are selected from the group consisting of phosphoric acid and organic derivatives of phosphinic acid, phosphonic acid and phosphoric acid, said organic derivatives having at least one organic moiety characterized by the presence of at least one functional group, preferably terminally located. Such organic derivatives can be saturated or unsaturated, and preferably have at least one organic moiety characterized by the presence of at least one unit of olefinic unsaturation. More particularly, such phosphorus-containing compounds have the characteristic formulae:

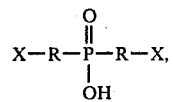

wherein each R is the same or different, and each R is independently a divalent organic radical directly bonded to the phosphorus atom through a carbon-phosphorus bond, said divalent radical being selected from the group consisting of divalent unsubstituted organic radical and divalent organic radical having at least one substituent group selected from the class consisting of halogen, hydroxyl, amino, alkyl radical containing from 1 to 8, preferably 1 to 4, carbon atoms and aryl radical having at least one moiety containing at least one aromatic nucleus; and wherein each X is the same or different, and each X is independently a functional group selected from the class consisting of hydrogen, hydroxyl, amino, mercapto, halogen and $CH_2=C>$;

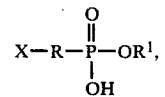

wherein R and X are as previously defined; and $R^1$ is hydrogen or $-R^2-X$, wherein $R^2$ is a divalent organic radical directly bonded to the oxygen radical through a carbon-oxygen bond, said divalent radical $R^2$ being selected from the group consisting of divalent unsubstituted organic radical and divalent organic radical having at least one substituent group selected from the class consisting of halogen, hydroxyl, amino, alkyl radical containing from 1 to 8, preferably 1 to 4, carbon atoms and aryl radical having at least one moiety containing at least one aromatic nucleus and X is as previously defined; and

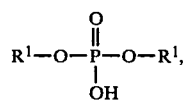

wherein $R^1$ is as previously described.

A currently preferred group of phosphorus-containing compound has the formula

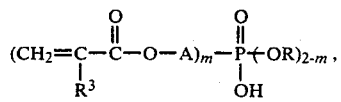

wherein $R^3$ is selected from the group consisting of hydrogen, halogen, an alkyl group having from one to 8, preferably one to 4, carbon atoms, and $CH_2=CH-$; $R^4$ is selected from the group consisting of hydrogen, an alkyl group having one to 8, preferably one to 4, carbon atoms; A is selected from the group consisting of $-R^5O-$ and $R^6O)_n$, wherein $R^5$ is an aliphatic or cycloaliphatic alkylene group group containing from one to 9, preferably 2 to 6, carbon atoms; $R^6$ is an alkylene group having from one to 7, preferably 2 to 4, carbon atoms; n is an integer from 2 to 10, and m is one or 2, preferably one.

In the several formulai I-IV, the divalent organic radicals R and $R^2$ can have a compound structure, that is, the radical can contain at least one, or a series of at least two, unsubstituted or substituted hydrocarbon group(s) containing or separated from each other by —O—, —S—, —COO—, —NH—, —NHCOO—, and $+R^7O)_{\overline{n}}$, wherein $R^7$ is an alkylene group group containing from 2 to 7, preferably 2 to 4 carbon atoms, and p is an integer from 2 to 10. Preferably, the divalent radical is an alkylene radical having a straight chain or ring of from one to 22, preferably one to 9, carbon atoms in any nonrepeating unit. It will be understood that divalent radicals having a compound structure would have two or more of such straight chains or rings. The divalent radicals can be saturated or unsaturated; aliphatic, cycloaliphtic or aromatic; and, with compound structures, can include mixtures thereof; and generally have from 1 to about 22 carbon atoms in each chain or ring of carbon atoms.

In the several formulae I—III, representative X—R— and X—$R^2$— radicals include, without limitation thereto, lower alkenyl, cyclohexenyl, hydroxy-lower alkenyl, halo-lower alkenyl, carboxy-lower alkenyl, lower alkyl, amino-lower alkyl, hydroxy-lower alkyl, mercapto-lower alkyl, alkoxy-lower alkyl, halo-lower alkyl, di-phosphonomethyl-amino-lower alkyl, phenyl-hydroxy-phosphonomethyl, aminophenyl-hydroxy-phosphonomethyl, halophenyl-hydroxy-phosphonomethyl, phenyl-amino-phosphonomethyl, halophenyl-amino-phosphonomethyl, hydroxy-phosphonomethyl, lower alkyl-hydroxy-phosphonomethyl, halo-lower alkyl-hydroxy-phosphonomethyl and amino-lower alkyl-hydroxyphosphonomethyl; the term "lower" referring to a group containing from 1 to 8, preferably 1-4 carbon atoms.

Phosphorus-containing compounds having vinyl unsaturation are preferred over such compounds having allylic unsaturation, with monoesters of phosphinic, phosphonic and phosphoric acids having one unit of vinyl or allylic, especially vinyl, unsaturation presently being preferred. Representative phosphorus-containing compounds include, without limitation, phosphoric acid; 2-acryloyloxyethyl phosphate; bis-(2-acryloyloxyethyl) phosphate; methyl-(2-methacryloyloxyethyl) phosphate; ethyl methacryloyloxyethyl phosphate; methyl acryloyloxyethyl phosphate; ethyl acryloyloxyethyl phosphate; compounds of Formula IV wherein $R^3$ is hydrogen or methyl and $R^4$ is propyl, isobutyl, ethylhexyl, halopropyl, haloisobutyl or haloethylhexyl; vinyl phosphonic acid; cyclohexene-3-phosphonic acid; alphahydroxybutene-2-phosphonic acid; 1-hydroxy-1-phenylmethane-1,1-diphosphonic acid; 1-hydroxy-1-methyl-1-1-diphosphonic acid; 1-amino-1-phenyl-1, 1-diphosphonic acid; 3-amino-1-hydroxypropane-1, 1-diphosphonic acid; amino-tris-(methylenephosphonic acid); gamma-aminopropylphosphonic acid; gamma-glycidoxypropylphosphonic acid; phosphoric acid-mono-2-aminoethyl ester; alkyl phosphonic acid; allyl phosphinic acid; β-methacryloyloxyethyl phosphinic acid; diallylphosphinic acid; bis(β-methacryloyloxyethyl) phosphinic acid and allyl methacryloyloxyethyl phosphinic acid.

Regardless of whether incorporated into the polymerizable adhesive composition or bonding activator, the phosphorus-containing compound will be present in an amount in the range from about 0.1 to about 20, preferably about 2 to about 10 weight percent, based on total weight of polymerizable adhesive composition, including reducing agent.

The bonding activators which are employed in the adhesive systems of this invention consist essentially of (1) from about 0.5 to about 30, preferably about 1 to about 10 weight percent, based on total weight of bonding activator, of at least one oxidizing agent which can function as an oxidant of a redox couple catalyst system; and (2) from about 70 to about 99.5 weight percent, based on total weight of bonding accelerator, of carrier vehicle.

The room temperature-reactive redox couple catalyst systems which are employed in the adhesive systems of this invention are well-known and need not be discussed herein in detail. Basically, such systems comprise at least one oxidizing agent and at least one reducing agent which are coreactive at room temperature to generate free radicals effective in the present invention, to initiate addition polymerization reactions. Substantially any of the known oxidizing and reducing agents which are so coreactive can be employed in the practice of the present invention. Representative oxidizing agents include, without limitation, organic peroxides such as benzoyl peroxide and other diacyl peroxides, hydroperoxides such as cumene hydroperoxide, peresters such as t-butylperoxybenzoate; ketone hydroperoxides such as methyl ethyl ketone, organic salts of transition metals such as cobalt naphthenate, and compounds containing a labile chlorine such as sulfonyl chloride. Representative reducing agents include, without limitation, sulfinic acids; azo compounds such as azoisobutyric acid dinitrile; alpha-aminosulfones such as bis(tolylsulfonmethyl) amine, bis-(tolylsulfonmethyl) ethyl amine and bis-(tolylsulfonmethyl)-benzyl amine; tertiary amines such as diisopropyl-p-toluidine, dimethyl aniline and dimethyl-p-toluidine; and amine-aldehyde condensation products, for example, the condensation products of aliphatic aldehydes such as butyraldehyde with primary amines such as aniline or butylamine. The use of known accelerators and promoters with the redox couple catalyst systems can be advantageous. Preferably, the oxidizing agent will be present in an amount in the range from about 0.5 to about 30, preferably about one to about 10, percent by weight of bonding accelerator, with the amount of reducing agent being in the range from about 0.05 to about 10, preferably about 0.1 to about 6, percent by weight of polymerizable adhesive composition. With the fourth class of adhesive systems, the bonding accelerator will contain at least one of the following materials at the indicated concentrations: tertiary amine, 0.01–5, preferably 0.01–1.5, wt.-%; transition metal organic salt, 0.01–5, preferably 0.01–2.5, wt.-%; and free radical generator, 0.05–10, preferably 0.05–5, wt.-%; based on total weight of accelerator.

The carrier vehicles which are suitable for use in the bonding activators of the present invention can be a simple inert solvent or diluent such as methylene chloride, or butyl benzyl phthalate, including mixtures of such solvents or diluents. The carrier vehicle should contain not more than 5% by weight of any moiety which is reactive with the oxidizing agent at room temperature. The carrier vehicle can be a more complex mixture including at least one film-forming binder in addition to inert solvent or diluent. In this case, the film-forming binder is preferably substantially inert with respect to the oxidant which is present in the primer composition. A particularly preferred carrier vehicle comprising at least one film-forming binder is an admixture comprising about 0.05 to about 50 percent by weight of, (1), of at least one saturated organic polymeric film-forming binder having a glass transition temperature in the range from about 0° C. to about 150° C. or, (2), at least one polymer-in-monomer syrup as described herein; and from about 40 to about 99 percent by weight of at least one organic solvent capable of maintaining the film-forming binder, phosphorous-containing compound when incorporated into the bonding activator composition, and oxidizing agent as a stable solution or dispersion. Among the polymeric film-forming binder materials which can be employed in the carrier vehicle are without limitation, polyalkylacrylates and methacrylates and copolymers thereof, polystyrene and copolymers thereof, vinyl polymers and copolymers, polyesters, polyketones, polysulfones, phenolic resins, polyvinyl butyrals, and polycarbonates. The carrier vehicle can contain, in addition to solvent or solvent and film-forming binder, additives such as external plasticizers, flexibilizers, suspenders, and stabilizers, providing that any such additives do not unacceptably adversely affect the stability of the activator compositions.

The novel adhesive primer compositions of the present invention, which are especially useful for activating metal surfaces, particularly untreated metal surfaces, for adhesive bonding consist essentially of (1) at least one oxidizing agent as previously described;

(2) from about 0.1 to about 20, preferably about 0.25 to about 2, percent by weight of total primer composition, of at least one phosphorus-containing compound as previously described; and (3) a carrier vehicle as previously described. Such primer compositions are especially adapted for use with the herein-described addition-polymerizable adhesive composition-reducing activator adhesive systems.

The primer compositions are readily prepared by any of the known standard blending procedures. The primers can likewise be applied by any conventional technique such as brushing, roller coating, flow coating, reverse roller coating, spraying, and electrostatic spraying. It is preferred that the primer composition be permitted to dry prior to contacting the primed substrate with the adhesive mass. Primed metal surfaces can be stored for periods in excess of six months with no apparent loss of adhesive capability.

During the development of the herein described adhesive systems and primer compositions, the addition of phosphorus-containing compound to polymerizable acrylic adhesive compositions has a retarding effect which is directly proportional to the amount of such compound. It was discovered that the addition of from about 0.01 to about 10, preferably 0.5 to 5, percent by weight of polymerizable adhesive compositions of certain tertiary amines having the formula

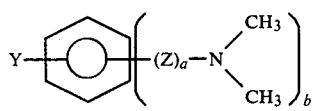

V.

wherein Z is methylene; Y is selected from the group consisting of hydrogen, hydroxy, amino, halogen, alkyl of 1 to 8, preferably 1 to 4, carbon atoms, and alkoxy having from 1 to 8, preferably 1 to 4, carbon atoms; a is zero, or 1; and b is 1 or 2; is effective to accelerate the cure of such compositions containing said phosphorus compounds. Especially preferred of such tertiary amines are N,N-dimethyl aniline and N,N-dimethyl amino methyl phenol. It is significant to note that tertiary amines which do not have the formula V do not appear to be effective as cure accelerators for polymerizable adhesive compositions containing phosphorus compounds having the formulae I-IV.

The use of the novel phosphorus compound-containing primer compositions with the herein described polymerizable adhesive compositions which themselves contain no phosphorus compound having the formulae I-IV has no deleterious effect on the cure rate of the adhesive systems; however, such phosphorus compound-containing bonding accelerators quite often evidence a loss in their bonding ability, oft times after only a few hours. It was discovered that the working life of the primer compositions could be significantly increased to two weeks or more with no deleterious side effects by the addition of from about 0.01 to about 5, preferably about 0.1 to about 1.0, weight percent, based on weight of primer composition, of at least one free radical scavenger, such as p-benzoquinone, hydroquinone, p-methoxyphenol, 1,4-dimethoxy-benzene chloranil, 2,6-di-t-butyl-p-cresol.

It has further been found that the environmental resistance of the herein described adhesive systems can be improved by the addition of from about 0.005 to about 15, preferably about 0.1 to about 10, percent by weight, based on total weight of polymerizable adhesive composition of a mixture of a metal molybdate selected from the group consisting of zinc molybdate, calcium molybdate, barium molybdate, strontium molybdate and mixtures thereof, and a metal phosphate selected from the group consisting of zinc phosphate, calcium phosphate, magnesium phosphate and mixtures thereof, said metal molybdate being present on a volume concentration basis of from about 2 to about 3 parts per part of said metal phosphate. Such mixtures, including their preparation, are more fully described in U.S. Pat. No. 4,017,315, the disclosure of which is incorporated herein by reference.

It has also been discovered that polybasic lead salts of phosphorus acid and saturated and unsaturated organic dicarboxylic acids and acid anhydrides, particularly dibasic lead phthalate, monohydrous tribasic lead maleate, tetrabasic lead fumarate, dibasic lead phosphite and mixutes thereof; and zinc oxide, in an amount in the range from about 0.1 to about 15, preferably about 1 to about 10, percent by weight, based on total weight of polymerizable adhesive composition, are effective in improving environmental resistance.

Other additives conventionally employed in adhesive compositions, such as fillers, pigments and the like can be added to the herein-described adhesives systems.

The base adhesive compositions, bonding accelerators and adhesive primer compositions are prepared by conventional methods, such as are disclosed, for example, in U.S. Pat. Nos. 3,832,274 and 3,890,407.

The adhesive systems and primer compositions of the present invention may be used to bond metal surfaces, such as steel, aluminum and copper, to a variety of substrates, including metals, plastics and other polymers, fibers, glass, ceramics, wood and the like. The adhesive systems can be employed as multipack adhesive systems where one part contains the polymerizable adhesive composition and a second part contains the herein-described bonding accelerators. Alternatively, it can be employed as a primer system. When used as a multipart system, one or both surfaces to be joined are coated with the adhesive system obtained by mixing the individual parts, and the surfaces are placed in contact with each other. In the primer system, the primer composition or bonding activator is first applied to one or both of the surfaces to be joined, and the adhesive resin mass containing polymerizable adhesive composition is applied to at least one of the surfaces, which are then placed in contact with each other. In the general case, the primer system is operationally more convenient.

It is a particular feature of the present invention that the hereindescribed primer and adhesive compositions can be employed to bond metal substrates such as steel, aluminum and copper with little, if any, pretreatment of the metal surface prior to application of the primer or adhesive, as the case may be. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing. They can also be employed on porous substrates, unlike the anaerobic adhesives which require the exclusion of air and thus cannot be used on surfaces containing air in their pores.

The invention is illustrated by the following examples, wherein all parts, proportions and percentages are by weight unless otherwise indicated.

EXAMPLE 1

A series of adhesive resins and polymer-in-monomer syrups are prepared as follows:

Adhesive Resin I: To a suitable reaction vessel equipped with stirrer, thermometer, dry air purge, and Dean Stark trap and condenser, where charged 1.0 mole of polycaprolactone triol, molecular weight average of 540, (PCP-0300 available from Union Carbide Corporation), 0.65 mole of polycaprolactone diol, average molecular weight of 2,000, (PCP-0240 available from Union Carbide Corporation) and sufficient methyl methacrylate monomer to give a non-volatile content of 65% after all ingredients had been added. A known excess of methyl methacrylate monomer was added and the contents of the reaction vessel heated to boiling with stirring and dry air purge. The excess methyl methacrylate monomer was removed along with any water present in the reaction vessel, as methyl methacrylate and water for a low boiling azeotrope. The temperature was lowered to 60° C., and 4.3 moles of toluene diisocyanate added to the reaction vessel. The temperature was maintained at 70°-80° C., until all —OH groups had been reacted (about 2 hours), yielding —NCO terminated urethane dissolved in the methyl methacrylate monomer, 4.3 moles of hydroxy ethyl methacrylate (HEMA) were then added to the reaction vessel and the temperature held at 70°-80° C., until all —NCO had been reacted (about 2 hours). A slight excess (about 10%) HEMA may be added to facilitate completion. Dibutyl tin dilaurate or stannous octoate catalyst may also be used.

Polymer-in-monomer syrup I: Following the procedure of Example I of U.S.A. Pat. No. 3,333,025, eighteen parts, by weight, of polychloroprene (neoprene WRT) are dissolved in 76 parts of methylmethacrylate and 6 parts of styrene. The mixture is heated to 80° C., after which 0.01 percent of azobisisobutyronitrile is added and the material partially polymerized to a viscosity of about 170,000 cps.

Polymer-in-monomer syrup II: A medium molecular weight poly(methyl methacrylate) homopolymer, "Acryloid ®" (TM, Rohm & Haas Company) A-11, is blended with methyl methacrylate to provide a 70 percent resin solids polymer-in-monomer syrup. Alternatively, polymer-in-monomer syrup II can be made as a partial polymerization product of poly(methyl methacrylate) homopolymer in monomeric methyl methacrylate by polymerizing methyl methacrylate by a process similar to that employed in preparing Syrup I.

EXAMPLE II

Adhesive systems are prepared in a conventional manner having the following compositions (amounts in weight percent):

| Adhesive System | II-1 | II-2 | II-3 |
|---|---|---|---|
| Polymerizable adhesive composition | | | |
| Adhesive resin I (Ex. I) | 17.68 | 15.68 | 17.68 |
| Carboxylated Poly(1,3-butadiene/acrylonitrile) elastomer "Hycar" (TM, E. I. duPont) 1072 | 12.47 | 11.24 | 12.47 |
| Methyl methacrylate | 56.21 | 48.74 | 56.21 |
| Methacrylic acid | 8.90 | 7.80 | 8.90 |
| 2-methacryloyloxyethyl phosphate | — | 6.1 | — |
| N,N-diisopropanol-p-toluidine | 1.3 | 1.1 | 1.3 |
| N,N-dimethylaniline | — | 1.8 | — |
| Moly ® (TM,Amax) FR-21[a] | — | 4.4 | 4.4 |
| Bonding accelerator: | | | |
| Benzoyl peroxide | 50. | 50. | 50.0 |
| 2-methacryloyloxyethyl phosphate | — | — | 1.5 |
| Dibutyl phthalate | 50. | 50. | — |
| Methylene chloride | — | — | 66.0 |
| Trichloroethane | — | — | 14.4 |
| Methyl isobutyl ketone | — | — | 8.6 |
| Syrup I | — | — | 1.5 |

[a] A mixture of calcium molybdate (3 vols.) and zinc phosphate (2 vols.) on inert substrate.

After blending and agitating the ingredients of the polymerizable adhesive compositions and the bonding accelerators to obtain separate homogeneous compositions, the adhesive systems are employed to bond steel-steel and aluminum-aluminum at room temperature. In the case of adhesive systems II-1 and II-2, the bonding accelerator is admixed with the adhesive composition in an amount of 4 parts by weight per 100 parts by weight of polymerizable adhesive composition. The fully-mixed adhesive system is coated onto one mating surface and a second uncoated mating surface is pressed onto the adhesive to complete the test composite. In the case of adhesive systems II-3, the bonding accelerator is coated onto both mating surfaces to provide a dry film thickness of 0.3 mil. After the accelerator has dried, the polymerizable adhesive composition is coated onto one of the accelerator-coating mating surfaces and the second accelerator-coated mating surface is pressed onto the adhesive mass to complete the test assembly. The total glueline is approximately 12 mils for each test composite. The test pieces are cured at room temperature for 24 hours. Lap shear strength tests are performed according to the procedure of ASTM D-1002-72. The results, in megapascals (MPa), are reported in Table I.

TABLE I

| Adhesive System | Substrate Prep'n. | Lap Shear Strength, megapascals | | | |
|---|---|---|---|---|---|
| | | CRS[a]-1010 | Al[b]-2024T3 | Al-5052-0 | Al-6061-T6 |
| II-1 | SW[c] | 3.8 | 1.4 | 7.3 | 10.1 |
| II-1 | GB[d] | 38.6 | 29.7 | 17.2 | 29.7 |
| II-2 | SW | 37.5 | 22.2 | 12.1 | 35.2 |
| II-3 | SW | 48.8 | 30.8 | 12.1 | 25.5 |

[a]CRS is cold rolled steel of indicated type.
[b]AL is aluminum of indicated type.
[c]SW is solvent-wiped.
[d]GB is grit-blasted and solvent-wiped.

The data demonstrate that the adhesive compositions of this invention are effective to bond metal substrates without the need for extensive surface preparation. For example, invention compositions 2 and 3 provide unexpectedly higher adhesion values in all instances in comparison to the control adhesive 1 for the same degree of substrate preparation. The control adhesive, which does not utilize the concepts of the invention, requires the additional surface preparation step of grit-blasting in order to approach the performance level obtained in the adhesives of this invention merely by solvent wiping of the mating surfaces. A commercially available vinyl plastisol adhesive, Hughson HC-4177 vinyl plastisol (Hughes Chemical Company, Detroit, Mich.), provides lap shear strength adhesive values for aluminum bonding in the range 4.4–6.6 megapascals depending on aluminum alloy being bonded and steel bonding in the range 5.5–7.2 megapascals. Commercial epoxy adhesive system such as 3M Company, Minneapolis, Minn., EC-3443 and B. F. Goodrich Chemical Company, Cleveland, Ohio, A1340B systems report adhesion values for aluminum bonding in the range 9.9–18.6 megapascals, depending on alloy, and for steel bonding in the range 13.8–20.2 megapascals. The adhesive compositions of this invention provide significantly enhanced adhesion for both steel and aluminum vis-a-vis such vinyl plastisol and epoxy adhesive systems.

EXAMPLE III

Separate polymerizable adhesive compositions and bonding accelerator compositions are prepared having the formulations (amounts in parts by weight) as follows:

| Adhesive System | III-1 | III-2 | III-3 |
|---|---|---|---|
| Polymerizable adhesive composition: | | | |
| Chlorosulfonated polyethylene | 30 | 30 | 30 |
| Methyl methacrylate | 10 | 10 | 10 |
| 2-methacryloyloxyethyl phosphate | — | 1 | 2 |
| Bonding accelerator: | | | |
| n-butyraldehyde-aniline condensation product | 80 | 80 | 80 |
| Monochlorotoluene | 20 | 20 | 20 |

Following the primer mode of Example II, the adhesive systems are employed to bond steel-steel and aluminum-aluminum composite assemblies. Lap shear strength test results are reported in Table II.

TABLE II

| Adhesive System | Substrate Prep'n. | Lap Shear Strength, megapascals | |
|---|---|---|---|
| | | CRS-1010 | AL-6061-T6 |
| III-1 | SW | 25.2 | 27.3 |
| III-2 | SW | 29.3 | 28.7 |
| III-3 | SW | 33.1 | 27.3 |

The data clearly demonstrate the ability of the herein described adhesive systems to provide significant adhesive values without extensive pretreatment of mating surfaces.

EXAMPLE IV

Adhesive systems are prepared according to the following formulations (amounts in weight percent):

| Adhesive System | IV-1 | IV-2 |
|---|---|---|
| Polymerizable adhesive composition: | | |
| Carboxylated poly(1,3-butadiene/acrylonitrile) elastomer (Hycar 1072) | 8.7 | 8.7 |
| Poly(methyl methacrylate) | 12.8 | 12.8 |
| Methyl methacrylate | 65.5 | 65.5 |
| 2-methacryloyloxyethyl phosphate | — | 4.3 |
| Diisopropanol-p-toluidine | 1.3 | 1.3 |
| N,N-dimethyl aniline | — | 1.8 |
| Molywhite (TM, Sherwin Williams) 212[a] | — | 4.4 |
| Bonding accelerator: | | |
| Benzoyl peroxide | 8.0 | 8.0 |
| Methylene chloride | 66.0 | 66.0 |
| Trichloroethane | 14.4 | 14.4 |
| Methyl isobutyl ketone | 8.6 | 8.6 |
| Syrup I | 3.0 | 3.0 |

[a]Mixture of calcium molybdate (3 volumes) and zinc phosphate (2 volumes) on inert substrate.

Following the primer method of Example II, the adhesive systems are employed to bond steel-steel and aluminum-aluminum composite assemblies. Lap shear strength test results are reported in Table III.

TABLE III

| Adhesive System | Substrate Prep'n. | Lap Shear Strength, megapascals | |
|---|---|---|---|
| | | CRS-1010 | AL-6061-T6 |
| IV-1 | SW | 2.6 | 6.6 |
| IV-2 | SW | 22.8 | 27.4 |

The data demonstrate the ability of the herein-described adhesive systems to provide significantly enhanced adhesion with minimal substrate preparation.

EXAMPLE V

Following the procedure of Example II, adhesive systems are prepared according to the following formulations (amounts in weight percent):

| Adhesive | V-1 | V-2 |
|---|---|---|
| Polymerizable adhesive composition: | | |
| Poly(vinyl methyl ether) | 32.5 | 28.3 |
| Carboxylated poly(1,3-butadiene/acrylonitrile) elastomer, Hycar 1072 | 7.5 | 6.4 |
| Methyl methacrylate | 49.4 | 44.8 |
| Methacrylic acid | 9.0 | 7.8 |
| 2-methacryloyloxyethyl phosphate | — | 4.3 |
| Diisoproponil-p-toluidine | 1.8 | 1.5 |
| N,N-dimethylantline | — | 1.6 |
| Moly FR-21 | — | 4.4 |
| Silica | — | 1.6 |
| Bonding accelerator: | | |
| Benzoyl peroxide | 50 | 50 |
| Dibutyl phthalate | 50 | 50 |

After blending and agitating the ingredients of the polymerizable adhesive compositions and the bonding accelerator to obtain separate homogeneous compositions, the adhesive systems are used for steel-steel and aluminum-aluminum metal bonding. The bonding accelerator is admixed with the adhesive composition in an amount of 4 parts by weight per 100 parts of adhesive composition. The fully-mixed adhesive system is coated onto one mating surface and a second uncoated mating surface is pressed onto the adhesive to complete the test composite. The total glueline thickness is approximately 10 mils for each test composite. The test pieces are cured at room temperature for 24 hours. Lap shear strength tests are performed on the cured assemblies according to the procedure of ASTM D-1002-72. The test results, in megapascals, are reported in Table IV.

TABLE IV

| Adhesive System | Substrate Prep'n. | Lap Shear Strength, megapascals | |
|---|---|---|---|
| | | CRS-1010 | AL-6061-T6 |
| V-1 | GBB[a] | 24.1 | 21.5 |
| V-I | SW | 3.8 | 5.6 |
| V-II | SW | 23.8 | 23.1 |

[a]Glass bead blasted.

The data further demonstrate the ability of the adhesive systems of this invention to provide significant adhesion values without the need for extensive pretreatment of mating surfaces.

EXAMPLE VI

Adhesive systems are prepared from the following ingredients (amounts in parts by weight):

| Adhesive System II | 1 | 2 | 3 | 4 |
|---|---|---|---|---|
| Polymerizable adhesive composition: | | | | |
| Polymer-in-monomer Syrup I (Ex. I) | 93.2 | 93.2 | 40 | 40 |
| Polymer-in-monomer Syrup II, Alt. (Ex. I) | | | 48 | 48 |
| Unsaturated polyester resin (a resin obtained from about equal parts maleic-fumaric acid and 1,2-propylene glycol as a 60% solution in styrene) | 3.0 | 3.0 | — | — |
| Polyester resin (a resin obtained by the reaction of propylene glycol, phthalic acid and maleic anhydride in a molar proportion of 3.1:1.2 as a 75% solution in methyl methacrylate) | 1.0 | 1.0 | — | — |
| Methyl methacrylate | 2.0 | 4.0 | 1.3 | 3.3 |
| Methacrylic acid | — | — | 9.0 | 9.0 |
| 2-methacryloyloxyethyl phosphate | — | 5.0 | — | 5.0 |
| N,N-diisopropanol-p-toluidine | 0.5 | 0.5 | 1.5 | 1.5 |
| N,N-dimethylaniline | — | 2.0 | — | 2.0 |
| Paraffin wax | 0.3 | 0.3 | 0.3 | 0.3 |
| Silica | — | — | 3.0 | 3.0 |
| Bonding accelerator | | | | |
| Benzoyl peroxide | 50 | 50 | 50 | 50 |
| Dibutyl phthalate | 50 | 50 | 50 | 50 |

The bonding accelerator is admixed into the polymerizable adhesive composition in an amount of 4 percent by weight. The fully-admixed adhesive systems are employed for steel-steel and aluminum-aluminum bonding at room temperature. Bonding is effected by coating one mating surface with the fully mixed adhesive system. An uncoated mating surface is pressed onto the adhesive mass to complete the test composite. The completed composite is held under a slight pressure until polymerization of the adhesive mass is completed. Lap shear strength test results, ASTM D-1002-72, in megapascals are reported in Table V.

TABLE V

| Adhesive System | Substrate | Substrate Prep'n. | Lap Shear Strength, megapascals |
|---|---|---|---|
| VI-1 | CRS-1010 | SW | 9.4 |
| VI-2 | CRS-1010 | SW | 28.8 |
| VI-3 | CRS-1010 | SW | 3.1 |
| VI-4 | CRS-1010 | SW | 18.8 |
| VI-1 | Al-6061-T6 | SW | 7.6 |
| VI-2 | Al-6061-T6 | SW | 27.8 |
| VI-3 | Al-6061-T6 | SW | 2.7 |
| VI-4 | Al-6061-T6 | SW | 13.2 |

The data demonstrate the unexpectedly strong adhesion values provided by the adhesive compositions of this invention with minimal surface preparation.

EXAMPLE VII

The following adhesive systems are prepared (amounts in weight percent):

| Adhesive System | VII-1 | VII-2 | VII-3 |
|---|---|---|---|
| Polymerizable adhesive composition: | | | |
| Adhesive resin I (Ex. I) | 17.68 | 17.1 | 16.9 |
| Carboxylated Poly(1,3-butadiene/acrylonitrile) elastomer | 12.47 | 12.1 | 11.9 |
| Methyl methacrylate | 56.21 | 56.2 | 55.7 |
| Methacrylic acid | 8.90 | 8.6 | 8.5 |
| 2-methacryloyloxyethyl phosphate | — | 5.0 | 5.0 |
| N,N-diisopropanol-p-toluidine | 1.3 | 1.2 | 1.2 |
| N,N-dimethylaniline | — | — | 1.0 |
| Bonding accelerator | | | |
| Benzoyl peroxide | 50 | 50 | 50 |
| Dibutyl phthalate | 50 | 50 | 50 |

After thorough mixing, the polymerizable adhesive compositions are each divided into several aliquot portions. The bonding accelerator is thoroughly mixed into one aliquot of each adhesive composition in an amount of 4 percent by weight of polymerizable adhesive composition. The admixtures are employed for bonding aluminum-aluminum at room temperature. To effect bonding, the fully-admixed adhesive system is applied to one mating surface. The second mating surface is pressed onto the adhesive mass and the completed composite is held under a slight pressure until sufficient strength for handling develops. Glueline thickness is about 15 mils.

The remaining aliquots are stored at room temperature and 44° C. and employed after storage of 1 week, 4 week and 8 weeks to bond aluminum-aluminum at room temperature, following the procedure set forth above. Lap shear strength tests are performed, ASTM D-1002-72. The results are reported in the following Table:

| Adhesive System | Substrate | Substrate Prep'n. | Storage Temp. | Adhesive Stability Study | | | |
|---|---|---|---|---|---|---|---|
| | | | | t=0 | 1 Wk. | 4 Wks. | 8 Wks. |
| VII-1 | Al-6061-T6 | GB | RT | 29.3 | 20.3 | 24.4 | 28.2 |
| VII-1 | " | GB | 44° C. | 29.3 | 16.9 | 20.8 | 28.7 |
| VII-2 | " | SW | RT | 11.4 | 15.8 | 21.8 | 18.2 |
| VII-2 | " | SW | 44° C. | 11.4 | 17.9 | 25.8 | 28.6 |
| VII-3 | " | SW | RT | 32.7 | 29.6 | 33.7 | 33.7 |

-continued

Adhesive Stability Study

| Adhesive System | Substrate | Substrate Prep'n. | Storage Temp. | t=0 | 1 Wk. | 4 Wks. | 8 Wks. |
|---|---|---|---|---|---|---|---|
| VII-3 | " | SW | 44° C. | 32.7 | 25.1 | 29.4 | 28.7 |

The data demonstrate the excellent shelf-stability of the adhesive systems of the invention, with very little decline in properties even after 8 weeks storage at the elevated temperature. The data also demonstrate the improvement in adhesive values realized by the addition of tertiary amines having the formula V, such as N,N-dimethylaniline, to adhesive systems containing the phosphorus compounds in accordance with this invention.

EXAMPLE VIII

The following adhesive systems are prepared (amounts in weight percent):

| Adhesive System | VIII-1 | VIII-2 | VIII-3 | VIII-4 |
|---|---|---|---|---|
| Polymerizable adhesive composition: | | | | |
| Adhesive resin I (Ex. I) | 17.1 | 17.7 | 17.7 | — |
| Carboxylated Poly(1,3-butadiene/acrylonitrile) elastomer | 12.1 | 12.5 | 12.5 | — |
| Chlorosulfonated polyethylene | — | — | — | 27.4 |
| Methyl methacrylate | 56.2 | 56.2 | 56.2 | 53.9 |
| Methacrylic acid | 8.6 | 8.9 | 8.9 | 9.1 |
| Trimethylol propane triacrylate | — | — | — | 0.9 |
| Bis-phenol A/epichlorohydrin epoxy resin | — | — | — | 4.6 |
| 2-methacryloyloxyethyl phosphate | 5.0 | — | — | — |
| N,N-disopropanol-p-toluidine | 1.2 | 1.3 | 1.3 | — |
| Cumene hyaroperoxide | — | — | — | 1.0 |
| Silica | — | — | — | 3.8 |
| Bonding accelerator | | | | |
| Benzoyl peroxide | 50 | 8.0 | 50 | — |
| n-butyraldehyde-aniline condensation product | — | — | — | 80 |
| Dibutyl phthalate | 50 | — | 50 | — |
| Methylene chloride | — | 66.0 | — | — |
| Trichloroethane | — | 14.1 | — | — |
| Methyl isobutyl ketone | — | 8.6 | — | — |
| Monochloro toluene | — | — | — | 20 |
| Syrup I (Ex. I) | — | 3.0 | — | — |
| 2-methacryloyloxyethyl phosphate | — | 1.5 | — | — |

The adhesive systems are employed to bond steel-steel and aluminum-aluminum at room temperature. Bonding with adhesive systems VIII-1 and VIII-3 is effected according to the procedure of Example VII, with the bonding accelerator mixed into the polymerizable adhesive composition prior to application of the fully-admixed adhesive system. With adhesive systems VIII-2 and VIII-4, the bonding accelerator is used as a primer following the procedure of Example II. The test specimens are exposed for 500 hours to certain aggressive environments and tested for lap shear strength, ASTM D-1002-72, following such exposure. The test results, in megapascals, are reported in the Table: 500 Hour Exposure of Lap Shear Speciments to Aggressive Environment. The data are further demonstrative of the significant adhesion values which are obtained by the adhesive systems of this invention without the necessity of extensive pretreatment of substrate surfaces.

EXAMPLE IX

The following adhesive systems are prepared (amounts in weight percent):

| Adhesive System | IX-1 | IX-2 | IX-3 | IX-4 |
|---|---|---|---|---|
| Polymerizable adhesive composition: | | | | |
| Adhesive resin I (Ex. I) | 17.1 | 17.7 | 17.7 | — |
| Carboxylated Poly(1,3-butadiene/acrylonitrile) elastomer | 12.2 | 12.5 | 12.5 | — |
| Chlorosulfonated polyethylene | — | — | — | 27.4 |
| Methyl methacrylate | 56.2 | 56.2 | 56.2 | 53.9 |
| Methacrylic acid | 8.6 | 8.9 | 8.9 | 9.1 |
| Trimethylolpropane triacrylate | — | — | — | 0.9 |
| Bis-phenol A/epichlorohydrin epoxy resin | — | — | — | 4.6 |
| 2-methacryloyloxyethyl phosphate | 5.0 | — | — | — |
| Diisopropanol-p-toluidine | 1.2 | 1.3 | 1.3 | — |
| N,N-dimethyl aniline | 1.0 | — | — | — |
| Cumene hydroperoxide | — | — | — | 1.0 |
| Silica | — | — | — | 3.8 |
| Bonding accelerator | | | | |
| Benzoyl peroxide | 50 | 8.0 | 50 | — |
| 2-methacryloyloxyethyl phosphate | — | 0.5 | — | — |
| n-butyraldehyde-aniline condensation product | — | — | — | 80 |
| Dibutyl phthalate | 50 | — | 50 | — |
| Methylene chloride | — | 66.0 | — | — |
| Trichloroethane | — | 14.1 | — | — |
| Methyl isobutyl ketone | — | 8.6 | — | — |
| Monochlorotoluene | — | — | — | 20 |
| Syrup I (Ex. I) | — | 30 | — | — |

The adhesive are employed to bond steel-steel and aluminum-aluminum at room temperature following the bonding procedure of Example VIII. The test specimens are exposed for 1000 hours to 5T salt spray at 38° C. and tested according to the test procedure of Example VIII. The test results, in megapaschals, are reported in the Table: 1000 Hours Exposure of Lap Shear Specimens to 5% Salt Spray at 38° C.:

1000 Hours Exposure of Lap Shear Specimens to 5% Salt Spray at 38° C.

| Adhesive System | Substrate | Substrate | Lap Shear Strength, megapascals | | |
|---|---|---|---|---|---|
| | | | Initial | Final | % Retention |
| IX-1 | CRS-1010 | SW | 37.5 | 29.0 | 78 |
| IX-2 | CRS-1010 | SW | 48.9 | 37.0 | 76 |
| IX-3 | CRS-1010 | GB | 38.7 | 33.0 | 87 |
| IX-4 | CRS-1010 | SW | 16.5 | 27.6 | 167 |
| IX-1 | Al-5052-0 | SW | 12.2 | 9.9 | 82 |
| IX-2 | Al-5052-0 | SW | 12.2 | 0.4 | 4 |
| IX-3 | Al-5052-0 | GB | 17.5 | 11.6 | 66 |
| IX-4 | Al-5052-0 | SW | 11.7 | 0.0 | 0 |
| IX-1 | Al-6061-T6 | SW | 31.7 | 20.4 | 65 |
| IX-2 | Al-6061-T6 | SW | 25.6 | 11.2 | 44 |
| IX-3 | Al-6061-T6 | GB | 29.1 | 22.0 | 76 |
| IX-4 | Al-6061-T6 | SW | 20.1 | 1.9 | 9 |

The data demonstrate that the addition of tertiary amines such as N,N-dimethylaniline can be effective to augment environmental resistance.

EXAMPLE X

To aliquots of the polymerizable adhesive composition of adhesive system XI-1 of Example IX there are added 5 percent by weight of polymerizable adhesive composition of the following corrosion inhibitor additives: dibasic lead phosphite, tribasic lead maleate, dibasic lead phthalate, Moly FR-21 (see Example II), and zinc oxide. The resulting adhesive systems are employed to bond steel-steel and aluminum-aluminum at room temperature. Adhesive systems XI-1 and XI-3 of Example IX are used as control systems. The bonding is effected according to the fully-mixed adhesive system motif of Example VIII. The test specimens are exposed for up to 1000 hours to 100% relative humidity at 52° C. and tested according to the test procedure of Example VIII. The test results are reported in the Table: Comparison of Corrosion Inhibitors.

| Comparison of Corrosion Inhibitors | | | | | | | |
|---|---|---|---|---|---|---|---|
| Adhesive | | | Substrate | Lap Shear Strength, megapascals | | | |
| System | Inhibitor | Substrate | Prep'n. | t=o | 500 hrs. | 1000 hrs. | % Retention |
| IX-1 | None | CRS-1010 | SW | 33.7 | 15.5 | 4.5 | 14 |
| | | Al-6061-T6 | SW | 31.2 | 7.5 | 0.7 | 2 |
| IX-1 | Dibasic lead | CRS-1010 | SW | 33.9 | 17.7 | 3.7 | 11 |
| | Phosphite | Al-6061-T6 | SW | 31.9 | 20.5 | 12.2 | 39 |
| IX-1 | Tribasic lead | CRS-1010 | SW | 32.4 | 17.0 | 2.0 | 6 |
| | Maleate | Al-6061-T6 | SW | 31.3 | 20.0 | 9.1 | 29 |
| IX-1 | Dibasic lead | CRS-1010 | SW | 34.2 | 18.7 | 4.8 | 14 |
| | Phthalate | Al-6061-T6 | SW | 31.0 | 25.6 | 15.5 | 50 |
| IX-1 | Moly FR-21 | CRS-1010 | SW | 38.3 | 20.8 | 6.0 | 16 |
| | | Al-6061-T6 | SW | 32.6 | 26.0 | 19.2 | 59 |
| IX-1 | Zinc oxide | CRS-1010 | SW | 31.8 | 19.9 | 9.3 | 30 |
| | | Al-6061-T6 | SW | 27.3 | 8.5 | 1.7 | 6 |
| IX-3 | None | CRS-1010 | GB | 37.5 | 27.1 | 14.5 | 39 |
| | | Al-6061-T6 | GB | 26.9 | 25.6 | 18.8 | 70 |

The data demonstrate that lead salts of phosphorus acid and organic polycarboxylic acids, zinc oxide and mixtures of molybdate salts with phosphate salts are effective to augment environmental resistance.

EXAMPLE XI

To aliquots of the polymerizable adhesive composition of adhesive system VIII-3 containing no reducing agent, there are added varying amounts of N,N-dimethyl aniline (DMA), a tertiary amine having the formula V, and N,N-diisopropanol-p-toluidine (DIIPT), a conventional and widely-used amine reducing agent for redox couple catalyst system. The resulting adhesive systems are employed to bond aluminum-aluminum (Al-6061-T6) at room temperature. Surface preparation of all mating surfaces is solvent wiping only. Bonding is effected according to the procedure of Example X. Lap shear strength test results, ASTM D-1002-72, in megapascals are reported in the Table: N,N-Dimethylaniline/N,N-Diisopropanol-p-Toluidine Reducing Agents for Phosphate-Modified Polymerizable Adhesive Systems.

| N,N-Dimethylaniline/N,N-Diisopropanol-p-Toluidine Reducing Agents for Phosphate-Modified Polymerizable Adhesive Systems | | | | | |
|---|---|---|---|---|---|
| Adhesive System X-1 | -1 | -2 | -3 | -4 | -5 |
| Polymerizable adhesive composition VIII-3 (no reducing agent), parts by weight | 100 | 100 | 100 | 100 | 100 |
| Moles amine | .032 | .032 | .032 | .032 | .032 |
| Fraction DMA | 0 | 0.25 | 0.50 | 0.75 | 1.0 |
| Fraction DIIPT | 1.0 | 0.75 | 0.50 | 0.25 | 0.0 |
| Handleable cure | 30 hrs | 3 hrs | 80 min | 50 min | 25 min |
| Lap shear strength, MPa | 21.4 | 28.7 | 29.2 | 32.6 | 32.5 |

The data demonstrate the significant reduction in cure time which is obtained by the addition of tertiary amines having the formula V.

EXAMPLE XII

The following adhesive systems are prepared (amounts in parts by weight):

| Adhesive System XII | 1 | 2 | 3 | 4 | 5 | 6 |
|---|---|---|---|---|---|---|
| Polymerizable adhesive composition: | | | | | | |
| Adhesive resin I (Ex. I) | 17.1 | 17.1 | 17.1 | 17.1 | 17.1 | 17.1 |
| Carboxylated Poly (1,3-butadiene/acrylonitrile) elastomer | 12.1 | 12.1 | 12.1 | 12.1 | 17.1 | 1.21 |
| Methyl methacrylate | 56.2 | 56.2 | 56.2 | 56.2 | 56.2 | 56.2 |
| Methacrylic acid | 8.6 | 8.6 | 8.6 | 8.6 | 8.6 | 8.6 |
| 2-methacryloyloxyethyl phosphate | 5.0 | 5.0 | 5.0 | 5.0 | 5.0 | 5.0 |
| N,N-diisopropanol-p-toluidine | 1.2 | — | 1.2 | 1.2 | 1.2 | 1.2 |
| N,N-dimethylaniline | 0 | 1.5 | 1.0 | 2.0 | 3.0 | 4.0 |
| Bonding accelerator | | | | | | |
| Benzoyl peroxide | 50 | 50 | 50 | 50 | 50 | 50 |
| Dibutyl phthalate | 50 | 50 | 50 | 50 | 50 | 50 |

The resulting adhesive systems are employed to bond steel-steel (CRS-1010) at room temperature. Bonding is effected according to the procedure of Example VII. Lap shear tests (ASTM D-1002-72), gel time and exotherm time (time from initial mixing to peak temperature of reaction mass, that is, fully-admixed adhesive system). The results are reported in the Table: Effect of N,N-dimethylaniline of Phosphate-Modified Polymerizable Adhesive Systems.

| Effect of N,N-Dimethylaniline on Phosphate-Modified Polymerizable Adhesive Systems | | | | | | |
|---|---|---|---|---|---|---|
| Adhesive System XII | -1 | -2 | -3 | -4 | -5 | -6 |
| Gel Time, min | >360 | 15 | 22.5 | 7.2 | 5 | 4.2 |
| Exotherm time, min. | — | 27 | 49 | 12.0 | 9.8 | 7.8 |
| Lap shear strength, MPa | 29.0 | 32.5 | 35.0 | 36.8 | 36.5 | 35.0 |

The data further demonstrate the significant increase in speed of cure obtained through the addition of tertiary amines having the formula V to polymerizable adhesive compositions. The data demonstrate also the unexpected improvements in adhesion values which results from the use of tertiary amines having the formula V in combination with conventional reducing components of redox couple catalyst systems.

| 500 Hour Exposure of Lap Shear Specimens to Aggressive Environment | | | | | | |
|---|---|---|---|---|---|---|
| Adhesive System | Substrate | Substrate Prep'n. | Inital[a] | Gasoline-RT[b] | Water-RT[c] | Salt Solution-RT | 100% Relative Humidity-52° C.[e] |
| VIII-1 | CRS-1010 | SW | 38.2 | 38.9 | 43.5 | 42.0 | 11.0 |
| VIII-2 | CRS-1010 | SW | 45.2 | 46.6 | 19.7 | 24.2 | 12.1 |
| VIII-3 | CRS-1010 | GB | 38.5 | 40.4 | 39.5 | 39.7 | 28.4 |
| VIII-4 | CRS-1010 | SW | 25.9 | 28.3 | 30.8 | 31.3 | 27.0 |
| VIII-1 | Al-5182 | SW | 16.7 | 16.6 | 14.7 | 14.0 | 7.0 |
| VIII-2 | Al-5182 | SW | 14.0 | 17.7 | 13.3 | 10.8 | 1.9 |
| VIII-4 | Al-5182 | SW | 24.1 | 17.0 | 13.7 | 31.3 | 6.6 |
| VIII-1 | Al-6061-T6 | SW | 27.5 | 26.7 | 25.0 | 23.3 | 5.5 |
| VIII-2 | Al-6061-T6 | SW | 27.5 | 27.6 | 13.9 | 13.0 | 4.4 |
| VIII-3 | Al-6061-T6 | GB | 26.7 | 30.3 | 26.1 | 28.9 | 25.9 |
| VIII-4 | Al-6061-T6 | SW | 21.5 | 26.6 | 21.4 | 5.0 | 3.3 |

[a]After 24 hour room temperature cure.
[b]Immersion in regular gasoline at room temperature.
[c]Immersion in tap water at room temperature.
[d]Immersion in a 5% salt solution at room temperature.
[e]52° C. 100% relative humidity.

What is claimed is:

1. A room temperature-curable adhesive system comprising 1. as a polymerizable adhesive composition, a mixture of
    (1) a polymer-in-monomer syrup consisting essentially of
        (i) from about 2 to about 60 percent by weight of at least one addition polymer;
        (ii) from about 10 to about 98 percent by weight of at least one polymerizable olefinically unsaturated compound having at least one $>C=C<$ group; and
        (iii) from zero to about 30 percent by weight of a polymer containing the group $-(CH_2CCl=CH-CH_2)_n$, wherein n is an integer;
    wherein (i) and (ii) are present as a partial polymerization product of (ii) or of (ii) in the presence of (iii), the mixture of (i) and (ii) or of (i), (ii) and (iii) being a syrup of polymeric materials dissolved or dispersed in monomer, in which syrup the amount of (i) derived from (ii) is in the range from about 2 to about 90 percent by weight, based on the total weight of (i), (ii) and (iii);
    (2) from zero to about 5 percent by weight of polymerizable adhesive composition of at least one unsaturated dicarboxylic acid ester;
    (3) from zero to about 10 percent by weight of polymerizable adhesive composition of at least one usaturated polyester resin;
    (4) from zero to about 20 percent by weight of polymerizable adhesive composition of at least one unsaturated carboxylic acid;
    (5) from zero to about 40 percent by weight of polymerizable adhesive composition of at least one monomeric acrylic or methacrylic acid ester, said ester (5) being in addition to any such ester employed in (1) (ii);
    (6) from zero to about 50 percent by weight of polymerizable adhesive composition of at least one polyvinyl alkyl ether;
    (7) from zero to about 1 percent by weight of polymerizable adhesive composition of at least one waxy substance selected from the group consisting of paraffin wax, montan wax, beeswax, ceresine wax and spermaceti wax;
    (8) an effective amount of at least one phosphorus-containing compound having the formulae

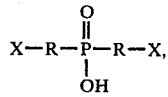

wherein each R is the same or different, and each R is independently a divalent organic radical directly bonded to the phosphorus atom through a carbon-phosphorus bond, said divalent radical being selected from the group consisting of divalent unsubstituted organic radical and divalent organic radical having at least one substitutent group selected from the class consisting of halogen, hydroxyl amino, alkyl radical containing from 1 to 8 carbon atoms and aryl radical having at least one moiety containing at least one aromatic nucleus; and wherein each X is the same or different, and each X is independently a functional group selected from the class concisting of hydrogen, hydroxyl, amino, mercapto, halogen and $CH_2=C\geqq$;

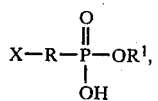

wherein R and X are as previously defined; and $R^1$ is hydrogen or $-R^2-X$, wherein $R^2$ is a divalent organic radical directly bonded to the oxygen radical through a carbon-oxygen bond, said divalent radical $R^2$ being selected from the group consisting of divalent unsubstituted organic radical and divalent organic radical having at least one substituent group selected from the class consisting of halogen, hydroxyl, amino, alkyl radical containing from 1 to 8 carbon atoms and aryl radical having at least one moiety containing at least one aromatic nucleus and X is as previously defined; and

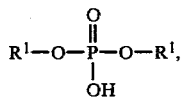
III.

wherein $R^1$ is as previously described;

(9) an effective amount of at least one reducing agent;

(10) from 0.01 to about 10 percent by weight of polymerizable adhesive composition of at least one tertiary amine having the formula

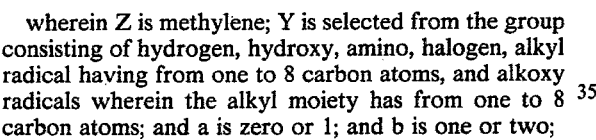
V.

wherein Z is methylene; Y is selected from the group consisting of hydrogen, hydroxy, amino, halogen, alkyl radical having from one to 8 carbon atoms, and alkoxy radicals wherein the alkyl moiety has from one to 8 carbon atoms; and a is zero or 1; and b is one or two;

(11) from zero to about 15 percent by weight of polymerizable adhesive composition of a mixture of a metal molybdate selected from the group consisting of zinc molybdate, calcium molybdate, barium molybdate, strontium molybdate and mixtures thereof and a metal phosphate selected from the group consisting of zinc phosphate, calcium phosphate, magnesium phosphate and mixtures thereof; said metal molybdate being present on a volume concentration basis of from about 2 to about 3 parts per part of said metal phosphate; and

(12) from zero to about 15 percent by weight of polymerizable adhesive composition of at least one compound selected from the group consisting of polybasic lead salts of phosphorus acid, polybasic lead salts of unsaturated organic dicarboxylic acids and acid anhydrides, polybasic lead salts of unsaturated organic dicarboxylic acids and acid anhydrides, zinc oxide, and mixtures thereof;

the amount (1), in weight percent, being 100 minus the combined weight percent of (2) through (12); and II. as a bonding accelerator, an effective amount of at least one oxidizing agent, said oxidizing agent being reactive at room temperature with said reducing agent to generate free radicals effective to initiate addition polymerization of said polymerizable adhesive composition.

2. An adhesive system according to claim 1 wherein said bonding accelerator contains from about 0.05 to about 50 percent by weight of at least one organic polymeric film-forming binder material selected from the group consisting of saturated organic 1 olymeric composition having a glass transition temperature in the range from about 0° C. to about 150° C. and polymer-in-monomer syrup, said polymer-in-monomer syrup consisting essentially of (i) from about 2 to about 60 percent by weight of at least one addition polymer;

(ii) from about 10 to about 98 percent by weight of at least one polymerizable olefinically unsaturated compound having at least one $>C=C\leqq$ group; and (iii) from zero to about 30 percent by weight of a polymer containing the group $+CH_2 CCl=CH-CH_2 )_{\overline{n}}$, wherein n is an integer;

wherein (i) and (ii) are present as a partial polymerization product of (ii) or of (ii) in the presence of (iii), the mixture of (i) and (ii) or of (i), (ii) and (iii) being a syrup of polymeric materials dissolved or dispersed in monomer, in which syrup the amount of (i) derived from (ii) is in the range from about 2 to about 90 percent by weight, based on the total weight of (i), (ii) and (iii); and from about 40 to about 99 percent by weight of a carrier comprising at least one inert organic diluent, said carrier vehicle being capable of maintaining said oxidizing agent and said film-forming binder material as a stable solution or dispersion.

3. An adhesive system according to claim 1 comprising (I) as a polymerizable adhesive composition, a mixture of (1) a first syrup of polymethylmethacrylate, polystyrene and polychloroprene in monomeric methyl methacrylate and styrene, said first syrup being in the form of a partial polymerization product of methyl methacrylate and styrene in polychloroprene, the polychloroprene being present in an amount from about 1 to about 25 percent by weight of polychloroprene, methyl methacrylate and styrene, the balance being essentially methyl methacrylate and styrene with the methyl methacrylate predominating;

(2) methacrylic acid;

(3) a second syrup of at least one polymer of at least one alkyl ester of acrylic or methacrylic acid, the alkyl moiety of such ester having from one to 8 carbon atoms, said second syrup being in the form of a partial polymerization product of said alkyl ester in methyl methacrylate, said polymer being present in an amount in the range from about 15 to about 60 percent by weight of said second syrup;

the relative proportions of (1), (2) and (3) being from about 10 to about 52 percent by weight of (1), from about 7 to not more than 15 percent by weight of (2) and from about 33 to about 83 percent by weight of (3);

(4) an effective amount of at least one phosphorus-containing compound having the formulae

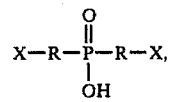
I.

wherein each R is the same or different, and each R is independently a divalent organic radical directly bonded to the phosphorus atom through a carbon-phosphorus bond, said divalent radical being selected from the group consisting of divalent unsubstituted organic radical and divalent organic radical having at least one substituent group selected from the class consisting of halogen, hydroxyl, amino, alkyl radical containing from 1 to 8 carbon atoms and aryl radical having at least one moiety containing at least one aromatic nucleus; and wherein each X is the same or different, and each X is independently a functional group selected from the class consisting of hydrogen, hydroxyl, amino, mercapto, halogen and $CH_2=C<$;

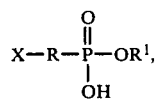
II.

wherein R and X are as previously defined; and $R^1$ is hydrogen or $—R^2—X$, wherein $R^2$ is a divalent organic radical directly bonded to the oxygen radical through a carbon-oxygen bond, said divalent radical $R^2$ being selected from the group consisting of divalent unsubstituted organic radical and divalent organic radical having at least one substituent group selected from the class consisting of halogen, hydroxyl, amino, alkyl radical containing from 1 to 8 carbon atoms and aryl radical having at least one moiety containing at least one aromatic nucleus and X is as previously defined; and

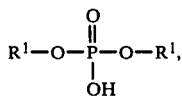
III.

wherein $R^1$ is as previously described;
(5) an effective amount of at least one reducing agent;
(6) from 0.01 to about 10 percent by weight of polymerizable adhesive composition of at least one tertiary amine having the formula

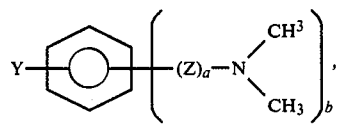
V.

wherein Z is methylene; Y is selected from the group consisting of hydrogen, hydroxy, amino, halogen, alkyl radical having from one to 8 carbon atoms, and alkoxy radicals wherein the alkyl moiety has from one to 8 carbon atoms; a is zero or one; and b is one or two;
(7) from zero to about 15 percent by weight of polymerizable adhesive composition of a mixture of a metal molybdate selected from the group consisting of zinc molybdate, calcium molybdate, barium molybdate, strontium molybdate and mixtures thereof and a metal phosphate selected from the group consisting of zinc phosphate, calcium phosphate, magnesium phosphate and mixtures thereof; said metal molybdate being present on a volume concentration basis of from about 2 to about 3 parts per part of said metal phosphate; and
(8) from zero to about 15 percent by weight of polymerizable adhesive composition of at least one compound selected from the group consisting of polybasic lead salts of phosphorus acid, polybasic lead salts of unsaturated organic dicarboxylic acids and acid anhydrides, polybasic lead salts of unsaturated organic dicarboxylic acids and acid anhydrides, zinc oxide, and mixtures thereof; and
II. as a bonding accelerator, an effective amount of at least one oxidizing agent, said oxidizing agent being reactive at room temperature with said reducing agent to generate free radicals to generate free radicals effective to initiate addition polymerization of said polymerizable adhesive composition.
4. An adhesive system according to claim 3 wherein said bonding accelerator contains from about 0.05 to about 50 percent by weight of at least one organic polymeric film-forming binder material selected from the group consisting of saturated organic polymeric composition having a glass transition temperature in the range from about 0° C. to about 150° C. and polymer-in-monomer syrup, said polymer-in-monomer syrup consisting essentially of
(i) from about 2 to about 60 percent by weight of at least one addition polymer;
(ii) from about 10 to about 98 percent by weight of at least one polymerizable olefinically unsaturated compound having at least one $>C=C\leqq$ group; and
(iii) from zero to about 30 percent by weight of a polymer containing the group $-(-CH_2CCl=CH—CH_2)_{\overline{n}}$, wherein n is an integer;
wherein (i) and (ii) are present as a partial polymerization product of (ii) or of (ii) in the presence of (iii), the mixture of (i) and (ii) or of (i), (ii) and (iii) being a syrup of polymeric materials dissolved or dispersed in monomer, in which syrup the amount of (i) derived from (ii) is in the range from about 2 to about 90 percent by weight, based on the total weight of (i), (ii) and (iii); and from about 40 to about 99 percent by weight of a carrier vehicle comprising at least one inert organic diluent, said carrier vehicle being capable of maintaining said oxidizing agent and said film-forming binder material as a stable solution or dispersion.

* * * * *